United States Patent
Bland

(10) Patent No.: US 6,494,044 B1
(45) Date of Patent: Dec. 17, 2002

(54) AERODYNAMIC DEVICES FOR ENHANCING SIDEPANEL COOLING ON AN IMPINGEMENT COOLED TRANSITION DUCT AND RELATED METHOD

(75) Inventor: Robert James Bland, Oviedo, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/715,034

(22) Filed: Nov. 20, 2000

Related U.S. Application Data

(60) Provisional application No. 60/166,315, filed on Nov. 19, 1999.

(51) Int. Cl.[7] .............................. F23R 3/04; F02C 3/00; F02C 7/18
(52) U.S. Cl. ............................ 60/772; 60/759; 60/760; 60/757
(58) Field of Search ........................... 60/757, 756, 755, 60/758, 759, 760, 266, 752, 772

(56) References Cited

U.S. PATENT DOCUMENTS

| | | | |
|---|---|---|---|
| 2,510,645 A | * 6/1950 | McMahan | 60/759 |
| 3,589,128 A | * 6/1971 | Sweet | 60/759 |
| 3,899,882 A | 8/1975 | Parker | |
| 4,192,138 A | * 3/1980 | Szema | 60/759 |
| 4,339,925 A | * 7/1982 | Eggmann et al. | 60/760 |
| 5,050,385 A | * 9/1991 | Hirose et al. | 60/752 |
| 5,309,710 A | * 5/1994 | Corr, II | 60/39.23 |
| 5,724,816 A | 3/1998 | Ritter et al. | |
| 5,737,915 A | 4/1998 | Lin et al. | |
| 5,758,504 A | * 6/1998 | Abreu et al. | 60/755 |
| 6,134,877 A | * 10/2000 | Alkabie | 60/760 |

FOREIGN PATENT DOCUMENTS

| | | | |
|---|---|---|---|
| JP | 55-164731 | * | 12/1980 |
| JP | 3-1015 | * | 1/1991 |

* cited by examiner

Primary Examiner—Ted Kim
(74) Attorney, Agent, or Firm—Nixon & Vanderhye P.C.

(57) ABSTRACT

A transition piece assembly for a gas turbine includes a transition duct having one end adapted for connection to a gas turbine combustor and an opposite end adapted for connection to a first turbine stage, and a pair of side panels. The assembly also includes an impingement sleeve surrounding the transition duct and establishing a cooling path therebetween. The impingement sleeve is formed with a plurality of rows of cooling holes therein; and a plurality of flow catcher devices on an external surface of the impingement sleeve, each flow catcher device at least partially surrounding one of the cooling holes.

11 Claims, 2 Drawing Sheets

AERODYNAMIC DEVICES FOR ENHANCING SIDEPANEL COOLING ON AN IMPINGEMENT COOLED TRANSITION DUCT AND RELATED METHOD

This application claims the benefit of Application Serial No. 60/166,315 filed Nov. 19, 1999, the entirety of which is incorporated herein by reference.

This invention relates generally to turbomachinery and, more particularly, to the cooling of transition ducts that connect a plurality of combustors to the first stage of a gas turbine.

BACKGROUND OF THE INVENTION

In a typical arrangement, combustors are arranged in an annular array within a compressor discharge opening, and are connected to the first stage of the turbine by transition ducts that are each shaped at one end to conform to a respective cylindrical combustor liner, and at an opposite end to conform to the turbine stage inlet. At the latter end, the transition duct has an external end frame by which the transition duct is secured to the turbine. In dry low NOx combustion systems in the assignee's gas turbine product line, a perforated impingement cooling sleeve surrounds the transition duct, and is used to direct compressor discharge cooling air into contact with the transition duct. This cooling air eventually mixes with the fuel in the combustor.

Transition ducts and their associated impingement sleeves are packed together very tightly in the compressor discharge casing. As a result, there is little area through which the compressor discharge air can flow in order to cool the outboard part of the transition duct. Consequently, the air moves very rapidly through the narrow gaps between adjacent transition duct sidepanels, and the static pressure of the air is thus relatively low. Since impingement cooling relies on static pressure differential, the sidepanels of the transition ducts are therefore severely undercooled. As a result, the low cycle fatigue life of the ducts may be below that specified. An example of cooling transition ducts by impingement cooling may be found in commonly owned U.S. Pat. No. 4,719,748.

BRIEF SUMMARY OF THE INVENTION

In accordance with an exemplary embodiment of this invention, poor cooling on the sidepanels of the transition duct is improved through the attachment of scoops on the external surface of the impingement sleeve, preferably along the side panels thereof, and thus also adjacent the side panels of the transition duct. These scoops stagnate the flow as it passes at high speed and redirects the flow onto the sidepanels of the transition duct. This redirect flow supplies sufficient cooling to cool the metal into a temperature zone where the material properties are sufficiently good to make the required life expectancy. The scoops may have various shapes and may be fixed to the sleeve in number and location determined by the shape of the sleeve, flow within the compressor discharge casing, and thermal loading on the transition duct.

In addition, the relative effectiveness of impingement cooling on non-scooped impingement cooling holes can be effected by the exact point of flow separation on the outboard side of the impingement sleeve relative to these cooling holes. Thus, another feature of this invention is to add aerodynamic devices to the surface of the impingement sleeve to enforce consistent flow separation at defined locations. In this regard, it has been noted in testing that locations on the edge of a hot sidepanel zone on the outboard side of the transition duct can see rapid and repeated fluctuations in temperature under certain load/geometric conditions. This instability in the temperature field is attributed to the separation point on the upper part of the impingement sleeve moving around in response to changes in compressor discharge swirl and other factors. A solution to this problem is to place features on the surface of the impingement sleeve that insure the flow separates at a given location relative to a cooling hole and thus produces a stable cooling flow. In the illustrative example, one or more solid members, such as, for example, a wire(s), is (are) fixed to the external surface of the impingement sleeve, extending generally along the sleeve outboard of a line of minimum space between adjacent impingement sleeves, and also outboard of the array of scoops arranged along the side panels of the impingement sleeve.

Accordingly, in one aspect, the present invention relates to a transition piece assembly for a gas turbine comprising a transition duct having one end adapted for connection to a gas turbine combustor and an opposite end adapted for connection to a first turbine stage, and a pair of side panels; an impingement sleeve surrounding the transition duct and establishing a cooling path therebetween, the impingement sleeve formed with a plurality of rows of cooling holes therein; and a plurality of flow catcher devices on an external surface of the impingement sleeve, each flow catcher at least partially surrounding one of the cooling holes.

In another aspect, the invention relates to a method of impingement cooling a transition duct connected between a gas turbine combustor and a first turbine stage with air discharged from a compressor comprising a) surrounding the transition duct with an impingement sleeve provided with a plurality of cooling holes; b) establishing a flow path for compressor discharge air along the impingement sleeve; and c) providing flow catcher devices on the impingement sleeve to catch and redirect the compressor discharge air through the impingement holes and onto the transition duct.

DETAILED DESCRIPTION OF THE INVENTION

Figure 1:
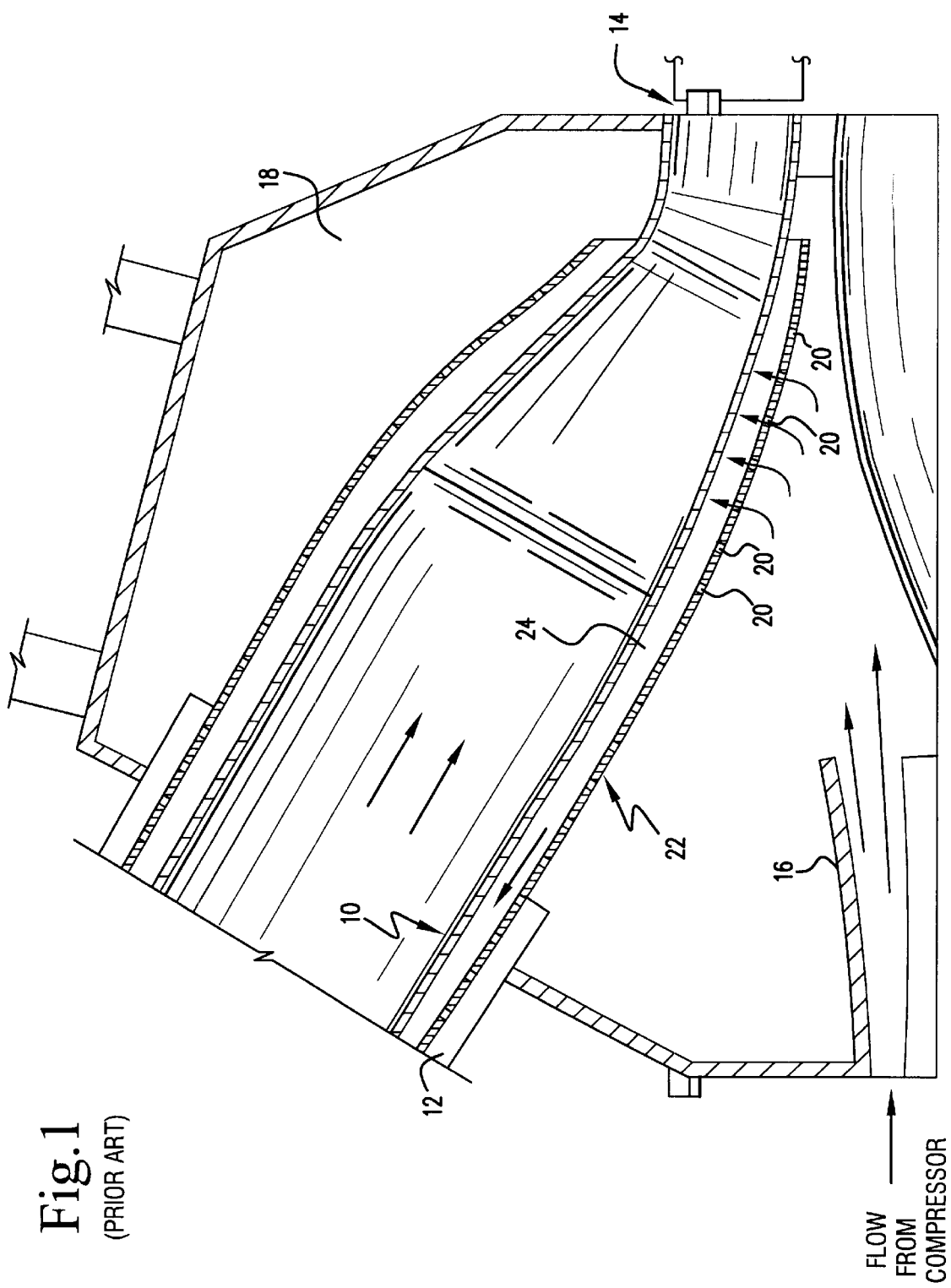
FIG. 1 is a simplified cross section of a conventional transition duct located between a combustor and a first turbine stage, and with the transition duct end frame omitted.

As mentioned above, a typical gas turbine includes an annular array of combustors, each having a transition duct connected between the combustor and the first turbine stage. A simplified illustration of one such transition duct and associated cooling sleeve is shown in FIG. 1. Specifically, the transition duct 10 carries hot combustion gases from an upstream combustor, as represented by the combustion liner 12, to the first stage inlet 14 of a turbine. Air flow from the gas turbine compressor exits an axial diffuser 16 and enters into a compressor discharge casing 18. About 50% of the compressor discharge air passes through cooling apertures or holes 20 formed along and about an impingement cooling sleeve 22 for flow into an annular region or annulus 24 between the transition duct 10 and the radially outer impingement sleeve, to cool the transition duct. The remaining approximately 50% of the compressor discharge flow passes into flow sleeve holes of an upstream combustion liner cooling sleeve (not shown) and into an annulus between the cooling sleeve and the liner and eventually mixes with the air transition duct annulus 24. This combined air eventually mixes with the gas turbine fuel in a combustion chamber.

Figure 2:
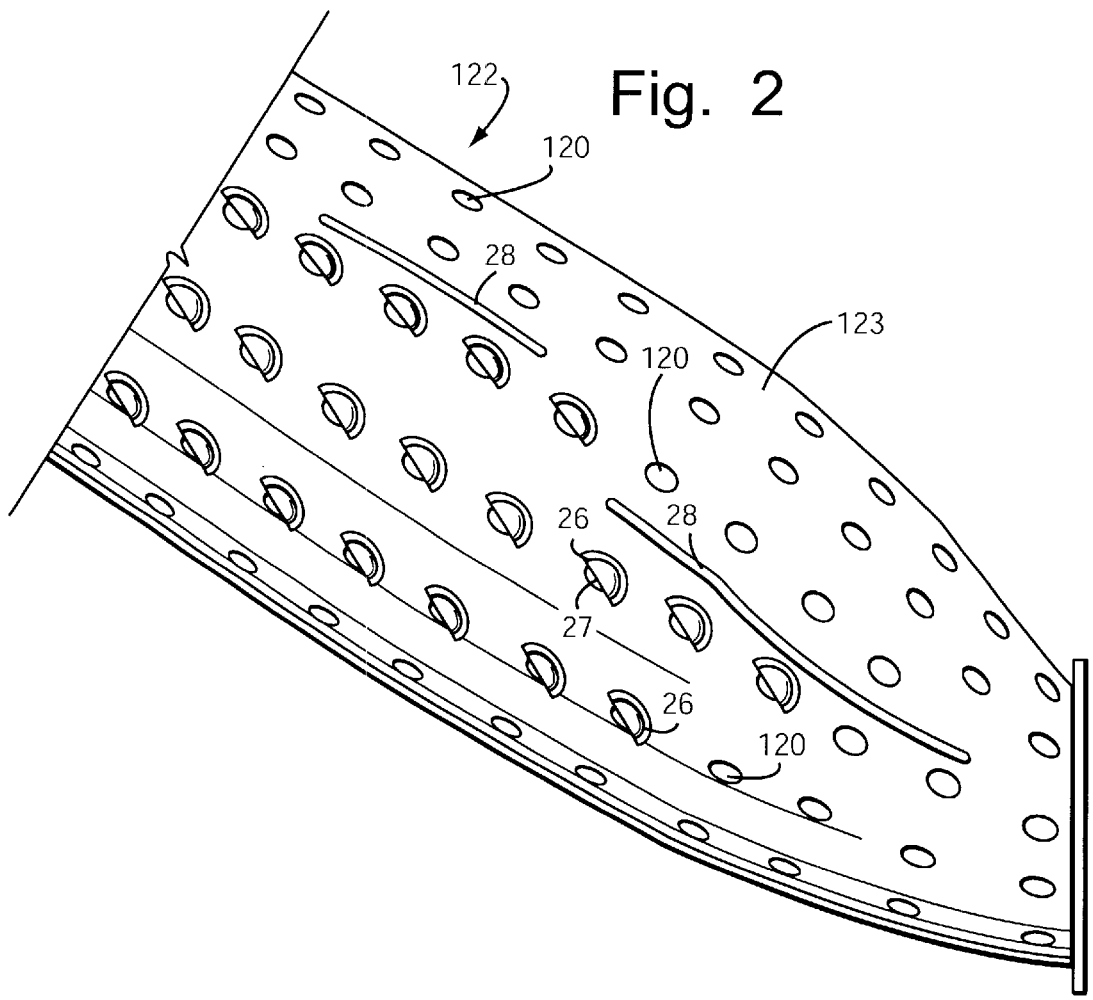
FIG. 2 is a simplified side elevation of a transition duct impingement sleeve, illustrating aerodynamic scoops and flow separator devices in accordance with the invention.
Figure 3:
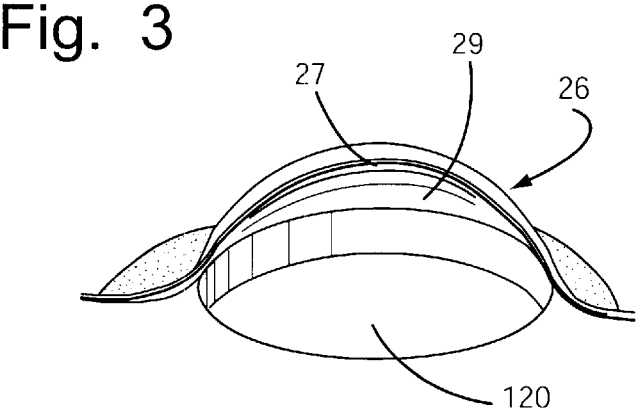
FIG. 3 is an enlarged detail of an aerodynamic scoop on the impingement sleeve.

FIG. 2 shows a transition duct impingement sleeve 122 with aerodynamic "flow catcher devices" 26 applied in accordance with the invention. In the exemplary embodiment, the devices 26 are in the form of scoops that are mounted on the surface 123 of the sleeve, along several rows of the impingement sleeve cooling holes 120, extending axially, circumferentially or both, preferably along the side panels that are adjacent similar side panels of the transition duct. As noted above, it is the side panels of the transition duct that are most difficult to cool, given the compact, annular array of combustors and transition ducts in certain gas turbine designs. A typical scoop can either fully or partially surround the cooling hole 120, (for example, the scoop could be in the shape of a half cylinder with or without a top) or partially or fully cover the hole and be generally part-spherical in shape. Other shapes that provide a similar flow catching functionality may also be used. As best seen in FIGS. 2 and 3, each scoop has an edge 27 that defines an open side 29, the edge lying in a plane substantially normal to the surface 123 of the impingement sleeve 122.

Scoops 26 are preferably welded individually to the sleeve, so as to direct the compressor discharge air radially inboard, through the open sides 29, holes 120 and onto the side panels of the transition duct. Within the framework of the invention, the open sides 29 of the scoops 26 can be angled toward the direction of flow. The scoops can be manufactured either singly, in a strip, or as a sheet with all scoops being fixed in a single operation. The number and location of the scoops 26 are defined by the shape of the impingement sleeve, flow within the compressor discharge casing, and thermal loading on the transition piece by the combustor.

Another feature of the invention includes strips 28 of material of constant section, e.g., a wire, fixed on the surface of the impingement sleeve 120 outboard of and adjacent a line of minimum area between adjacent transition pieces. After the minimum area point, the flow is diffusing which is an unstable flow regime. At some point, the flow can no longer follow the contour of the impingement sleeve, separates and hits the outboard wall of the compressor discharge casing. The flow on the surface effects the near surface pressure and thus the impingement performance in that area. The purpose of so-called "trip strips" 28 is to force the flow to leave the surface of the impingement sleeve at a known location. These strips must protrude from the surface an adequate distance so as to make it impossible for the flow to reattach to the surface behind them. In a typical installation, the strips 28 lie on the impingement sleeve surface outboard of the final row of scoops in an array of scoops along the side panels, i.e., strips 28 lie between a last row of scoops in an array of scoops and a row of holes 120 that are not fitted with scoops. An example of this kind of arrangement is illustrated in FIG. 2. However, the number, precise location and shape of the scoops 26 and trip strips or flow separators 28 are application specific.

In use, air is channeled toward the transition piece surface by the aerodynamic scoops 26 that project out into the high speed air flow passing the impingement sleeve. The scoops 26, by a combination of stagnation and redirection, catch air that would previously have passed the impingement cooling holes 120 due to the lack of static pressure differential to drive the flow through them, and directs the flow inward onto the hot surfaces (i.e., the side panels) of the transition duct, thus reducing the metal temperature to acceptable levels. At the same time, the trip strips 28 insure the separation of flow from the sleeve surface at the desired locations, thus enhancing the cooling capability of the impingement sleeve.

One advantages of this invention is that it can be applied to existing designs, is relatively cheap and easy to fit, and provides a local solution that can be applied to any area on the sidepanel needing additional cooling.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transition piece assembly for a gas turbine comprising:
   a transition duct having one end adapted for connection to a gas turbine combustor and an opposite end adapted for connection to a first turbine stage, and a pair of side panels;
   an impingement sleeve surrounding said transition duct and establishing a cooling path therebetween, said impingement sleeve formed with a plurality of rows of cooling holes therein; and
   a plurality of flow catcher devices, each flow catcher device comprising a scoop fixed to an outside surface of the impingement sleeve about a portion of a respective one of said cooling holes and having an open side defined by an edge of the scoop lying in a plane substantially normal to said outside surface and arranged to face a direction of cooling air flow, such that said flow catcher devices redirect said cooling air flow through said impingement sleeve and onto said transition duct.

2. The transition piece assembly of claim 1 wherein said plurality of flow catcher devices are welded to said impingement sleeve.

3. A transition piece assembly for a gas turbine comprising:
   a transition duct having one end adapted for connection to a gas turbine combustor and an opposite end adapted for connection to a first turbine stage, and a pair of side panels;
   an impingement sleeve surrounding said transition duct and establishing a cooling path therebetween, said impingement sleeve formed with a plurality of rows of cooling holes therein; and
   a plurality of flow catcher devices, each flow catcher device at least partially surrounding a respective one of said cooling holes, wherein each flow catcher device has an open side facing a direction of cooling air flow, such that said flow catcher devices redirect said cooling air flow through said impingement sleeve and onto said transition duct;
   and further comprising at least one solid strip of material extending along said external surface between at least one row of cooling holes having flow catcher devices and a row of cooling holes without flow catcher devices.

4. The transition piece assembly of claim 3 wherein said solid strip is located outboard of a line of minimum area between the impingement sleeve and an adjacent impingement sleeve.

5. An impingement sleeve for cooling a gas turbine transition piece, the impingement sleeve surrounding the transition piece and comprising a tubular body formed with a plurality of rows of cooling holes therein, and a plurality of flow catcher devices attached to an external surface of said impingement sleeve, such that each flow catcher device at least partially surrounds a respective one of said cooling holes, with an open side defined by an edge lying in a plane substantially normal to said external surface and arranged to face a direction of cooling air flow; and wherein each flow catcher device is generally part-spherical in shape.

6. The impingement sleeve of claim 5 wherein said flow catcher devices are arranged along at least some of said rows of cooling holes in axial or circumferential directions.

7. The impingement sleeve of claim 5 wherein said plurality of flow catcher devices are welded to said impingement sleeve.

8. An impingement sleeve for cooling a gas turbine transition piece, the impingement sleeve comprising a tubular body formed with a plurality of rows of cooling holes therein, and a plurality of flow catcher devices attached to an external surface of said impingement sleeve, each flow catcher device at least partially surrounding one of said cooling holes; and wherein each flow catcher device is generally part-spherical in shape; and further comprising at least one solid strip of material extending along said external surface between at least one row of cooling holes having flow catcher devices and a row of cooling holes without flow catcher devices.

9. A method of impingement cooling a transition duct connected between a gas turbine combustor and a first turbine stage with air discharged from a compressor comprising:

a) surrounding the transition duct with an impingement sleeve provided with a plurality of cooling holes;

b) establishing a flow path for compressor discharge air along said impingement sleeve; and c) providing flow catcher devices on an external surface of said impingement sleeve, said flow catcher devices having respective open sides defined by edges lying in planes substantially normal to said external surface, said open sides arranged to face a direction of cooling air flow so as to catch and redirect the compressor discharge air through the impingement holes and onto said transition duct.

10. The method of claim 9 wherein said flow catcher device are arranged along opposite side panels of said impingement sleeve, substantially adjacent corresponding side panels of said transition duct.

11. A method of impingement cooling a transition duct connected between a gas turbine combustor and a first turbine stage with air discharged from a compressor comprising:

a) surrounding the transition duct with an impingement sleeve provided with a plurality of cooling holes;

b) establishing a flow path for compressor discharge air along said impingement sleeve; and c) providing flow catcher devices on an external surface of said impingement sleeve to catch and redirect the compressor discharge air through the impingement holes and onto said transition duct;

and further comprising providing flow separator strips on said impingement sleeve, between a row of said cooling holes with flow catcher devices and a row of cooling holes without flow catcher devices.

\* \* \* \* \*